(12) United States Patent
Behnken et al.

(10) Patent No.: US 9,721,370 B2
(45) Date of Patent: Aug. 1, 2017

(54) KINETIC SEQUENCER FOR IOT DEVICES

(71) Applicant: International Business Machines Corporation, Armonk, NY (US)

(72) Inventors: John F. Behnken, Hurley, NY (US); Rhonda L. Childress, Austin, TX (US); David B. Kumhyr, Austin, TX (US); Michael J. Spisak, East Northport, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/887,995

(22) Filed: Oct. 20, 2015

(65) Prior Publication Data

US 2017/0109913 A1    Apr. 20, 2017

(51) Int. Cl.
| | | |
|---|---|---|
| G09G 5/00 | (2006.01) |
| G06T 11/60 | (2006.01) |
| G06F 3/00 | (2006.01) |
| G06F 3/01 | (2006.01) |
| G06F 1/16 | (2006.01) |

(52) U.S. Cl.
CPC .............. *G06T 11/60* (2013.01); *G06F 1/163* (2013.01); *G06F 3/005* (2013.01); *G06F 3/011* (2013.01)

(58) Field of Classification Search
CPC .......... G06K 9/00664–9/00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10

See application file for complete search history.

(56) References Cited

U.S. PATENT DOCUMENTS

| | | | | |
|---|---|---|---|---|
| 2010/0238161 A1* | 9/2010 | Varga | ...................... | G06T 17/05 345/419 |
| 2011/0164163 A1* | 7/2011 | Bilbrey | ................. | G06F 1/1694 348/333.01 |
| 2012/0075168 A1* | 3/2012 | Osterhout | ............ | G02B 27/017 345/8 |
| 2013/0006718 A1* | 1/2013 | Nielsen | ............ | G06Q 10/06312 705/7.42 |

(Continued)

OTHER PUBLICATIONS

Natasha Lomas, Notch Is a Wearable Sensor & App For Tracking And Capturing Body Movements http://techcrunch.com/2013/11/24/notch/.

(Continued)

*Primary Examiner* — Todd Buttram
(74) *Attorney, Agent, or Firm* — Terrile, Cannatti, Chambers & Holland, LLP; Stephen A. Terrile

(57) ABSTRACT

A system, method, and computer-readable medium are disclosed for memorizing a configuration sequence comprising: capturing an image of a device to be configured; recording a configuration sequence of physical movements performed by a user when configuring the device to provide a recorded configuration sequence; overlaying the sequence of physical movements with the image of the device to provide an overlaid image of the configuration sequence; and, storing the sequence of physical movements and the overlaid image of the configuration sequence.

12 Claims, 3 Drawing Sheets

(56) References Cited

U.S. PATENT DOCUMENTS

| | | | | |
|---|---|---|---|---|
| 2013/0174205 A1* | 7/2013 | Jacobsen | ......... | H04N 21/43637 |
| | | | | 725/81 |
| 2013/0223684 A1* | 8/2013 | Townend | .............. | G06Q 10/08 |
| | | | | 382/103 |
| 2014/0089028 A1* | 3/2014 | Marshall | ......... | G06Q 10/06311 |
| | | | | 705/7.15 |
| 2015/0077528 A1* | 3/2015 | Awdeh | .................... | G06T 11/00 |
| | | | | 348/53 |
| 2015/0146007 A1* | 5/2015 | Dusik | ............... | G06K 9/00671 |
| | | | | 348/161 |

OTHER PUBLICATIONS

IP.com, A method of switching on camera application quickly and automatically, IP.com No. IPCOM000231019D IP.com Electronic Publication: Sep. 22, 2013.

IP.com, Wearable electronic device, IP.com No. 000240005, IP.com Electronic Publication: Dec. 22, 2014.

Giancarlo Orengo, Modeling Wearable Bend Sensor Behavior for Human Motion Capture, IEEE Sensors, vol. 14, No. 7, Jul. 2014, pp. 2307-2316.

\* cited by examiner

US 9,721,370 B2

KINETIC SEQUENCER FOR IOT DEVICES

BACKGROUND OF THE INVENTION

Field of the Invention

The present invention relates in general to the field of computers and similar technologies, and in particular to software utilized in this field. Still more particularly, it relates to a method, system and computer-usable medium for sequencing Internet of Things (IoT) devices.

Description of the Related Art

It is known to communicate with and control many devices via the Internet. This communication and control is often referred to as the Internet of Things (IoT) and the devices are referred to as IoT devices. The IoT allows devices to be sensed and controlled remotely as well as to provide information based upon the type of IoT device across existing network infrastructure.

Many known devices require different sets of operations, button actuations and steps when configuring the devices. It can be difficult for users to remember these different sets of operations, etc. for the many devices with which a typical user interacts. Examples of devices which require different sets of operations include resetting the time on an automobile radio (e.g., which may be necessary twice per year for daylight savings), changing the time on alarm clocks, programming a digital video recorder (DVR), etc.

SUMMARY OF THE INVENTION

A system, method, and computer-readable medium are disclosed for memorizing a configuration sequence comprising: capturing an image of a device to be configured; recording a configuration sequence of physical movements performed by a user when configuring the device to provide a recorded configuration sequence; overlaying the sequence of physical movements with the image of the device to provide an overlaid image of the configuration sequence; and, storing the sequence of physical movements and the overlaid image of the configuration sequence.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
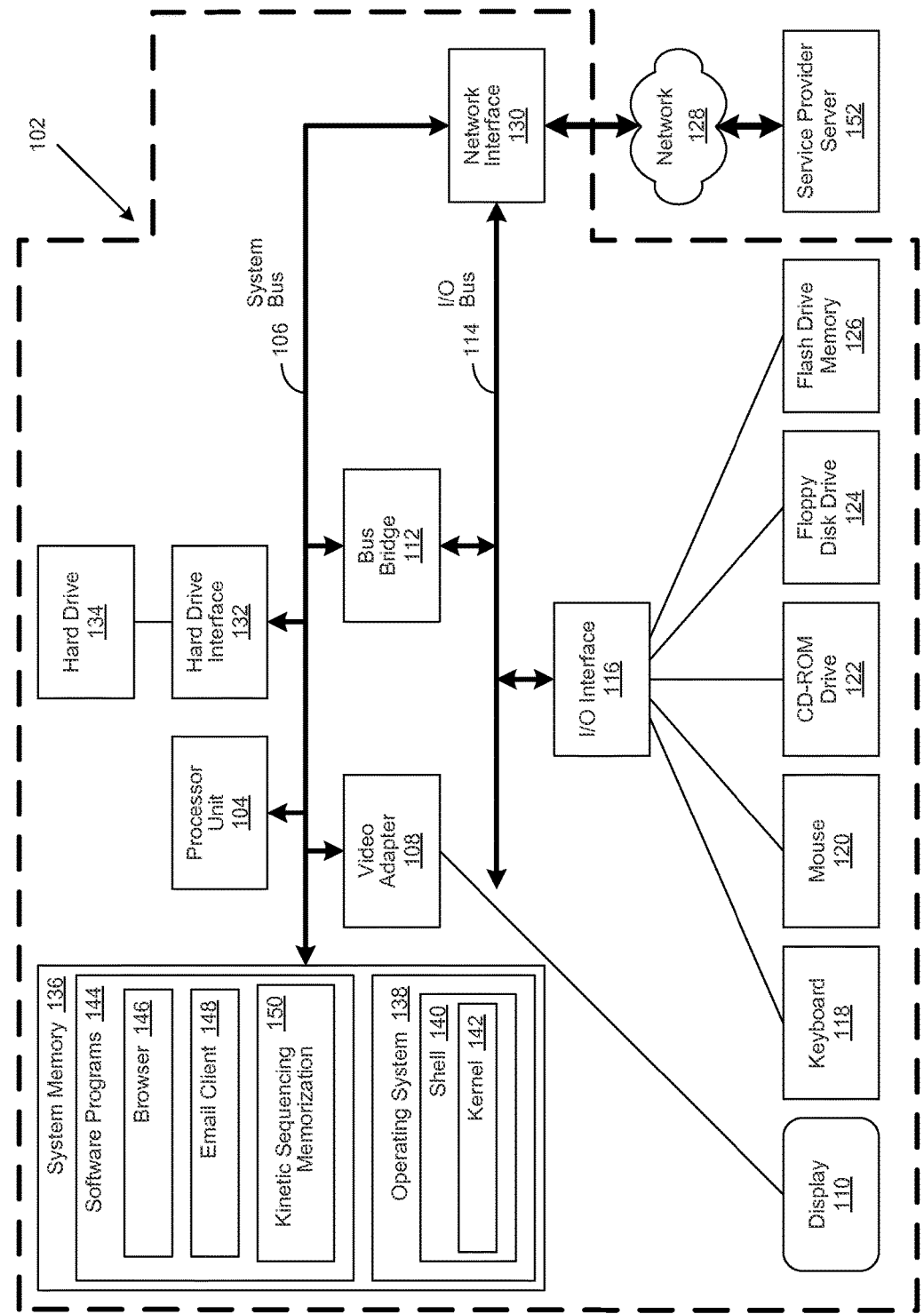
FIG. 1 depicts an exemplary client computer in which the present invention may be implemented.

A method, system and computer-usable medium are disclosed for performing a kinetic sequencing memorization operation. With a kinetic sequencing memorization operation, a device is provided with a kinetic sequencing memorization system which records kinetic movements of a user while performing a series of configuration steps. Additionally, in certain embodiments, the kinetic sequencing memorization operation further includes overlaying the recording of the kinetic movements while performing the configuration with a representation of the device on which the configuration is being performed. Additionally, in certain embodiments, the kinetic sequencing memorization system comprises an application executing on an IoT device In various embodiments, the visual representation of the sequence of kinetic movements is stored within the kinetic sequencing memorization system for a user to access in the future when a configuration operation is performed. Because the kinetic sequencing memorization system is contained within a system that is often in close proximity to a user, there is no need to locate and/or use a physical manual when a configuration operation is desired. Additionally, because the kinetic sequencing memorization system is contained within a system that is often in close proximity to a user there is no need for a user to attempt to memorize the configuration steps necessary for the many devices with which the user interacts.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management. Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. In various embodiments, software programs 144 may also include a kinetic sequencing memorization module 150. In these and other embodiments, the kinetic sequencing memorization module 150 includes code for implementing the processes described herein below. In one embodiment, client computer 102 is able to download the kinetic sequencing memorization module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit, scope and intent of the present invention.

Figure 2:
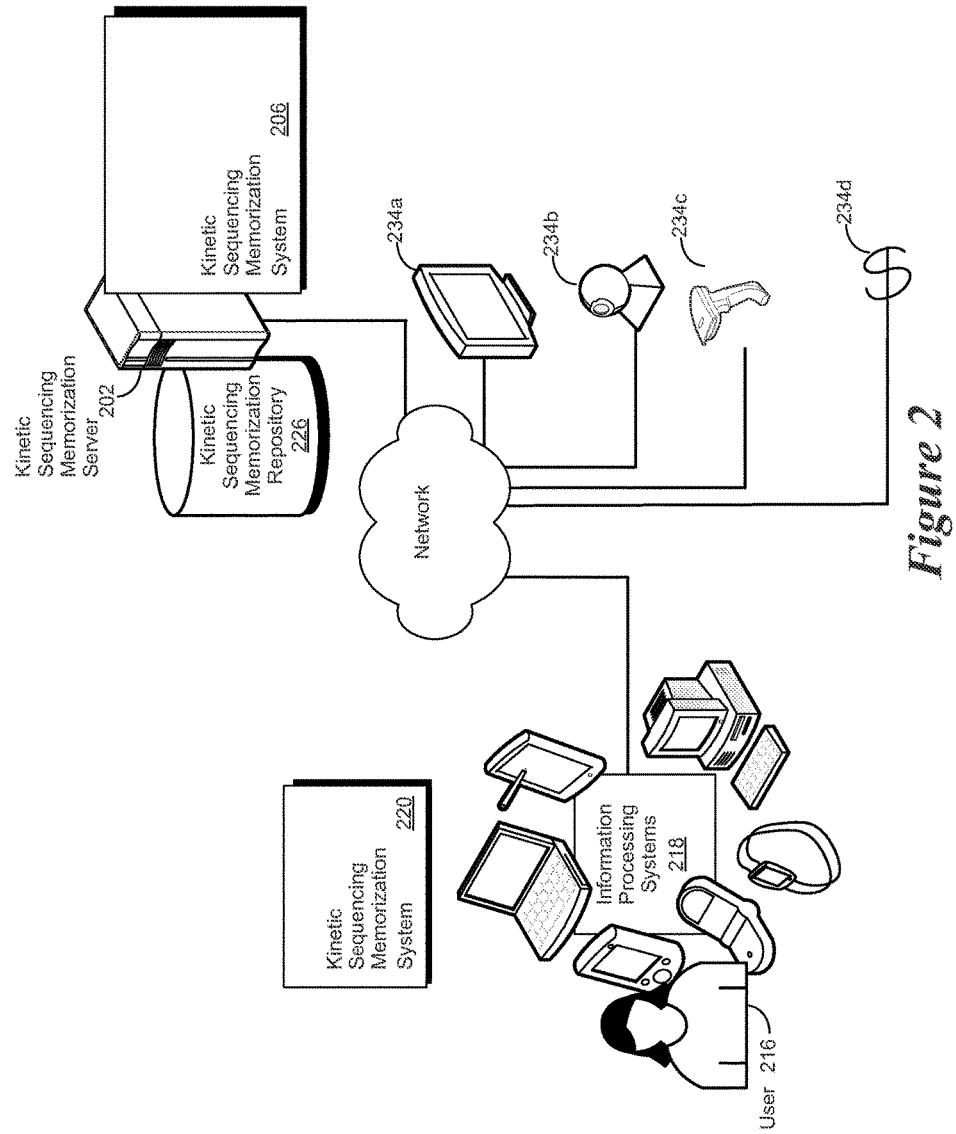
FIG. 2 is a simplified block diagram of a kinetic sequencing memorization environment having many IoT type devices.

Referring to FIG. 2, a simplified block diagram of a kinetic sequencing memorization environment 200 having many IoT type devices is shown.

The environment 200 includes a kinetic sequencing memorization server 202 which includes a kinetic sequencing memorization system 206. In certain embodiments, the kinetic sequencing memorization system 206 comprises some or all of the kinetic sequencing memorization module 150. In various embodiments, a user 216 may use an information processing system 218 to access the kinetic sequencing memorization systems 206.

As used herein, an information processing system 218 may comprise a personal computer, a laptop computer, or a tablet computer, operable to exchange data between the user 216 and the kinetic sequencing memorization server 202 over a connection to network 140. The information processing system 218 may also comprise a personal digital assistant (PDA), a mobile telephone (such as a smart phone), smart watch or any other suitable device operable to display a user interface (UI) and likewise operable to establish a connection with network 140. In various embodiments, one or more information processing system 206 includes a kinetic sequencing memorization system 220. Also, in various embodiments one or more of the information processing systems 218 include a motion sensing device. In various embodiments, some or all of the motion sensing devices include a kinetic motion sensor. In various embodiments, one or more of the information processing systems 218 include wearable devices. In various embodiments, the wearable devices include a smart watch type wearable device and smart glasses type wearable device (such as for example Google glasses). In various embodiments, the information processing system 218 is likewise operable to establish a session over the network 140 with the kinetic sequencing memorization system 206.

In various embodiments, kinetic sequencing memorization operations are performed by the kinetic sequencing memorization system 206 when configuring one or more devices (such as device 234). The kinetic sequencing memorization system 206 enables the environment 200 to perform kinetic sequencing configuration operations on any devices 234 including IoT type devices.

In operation, when performing a kinetic sequencing memorization operation, an information processing system 218 is provided with a kinetic sequencing memorization system 220 which records kinetic movements of a user while the user perform a series of configuration steps. The kinetic sequencing memorization operation further includes overlaying the recording of the kinetic movements while performing the configuration with a representation of the device on which the configuration is being performed. The representation of the device may be captured via a camera included with or associated with the information processing system. In certain embodiments, the kinetic sequencing memorization system 220 comprises an application executing on the information processing system 218. In certain embodiments, the information processing system 218 comprises an IoT type device.

The visual representation of the sequence of kinetic movements is stored within the kinetic sequencing memorization system 220 for a user to access in the future when a configuration operation is performed. Because the kinetic sequencing memorization system is contained within a system that is often in close proximity to the user 216, there is no need to locate and/or use a physical manual when a configuration operation is desired. Additionally, because the kinetic sequencing memorization system 220 is contained within a system that is often in close proximity to a user there is no need for a user to attempt to memorize the configuration steps necessary for the many devices 234 with which the user interacts.

Also, in certain embodiments, the information stored to the information processing system 218 may also be stored to a kinetic sequencing memorization repository 226 which is associated with the generalized kinetic sequencing memorization system 206. In this way other users wishing to configure their own devices can access this information from the kinetic sequencing memorization repository 226.

Figure 3:
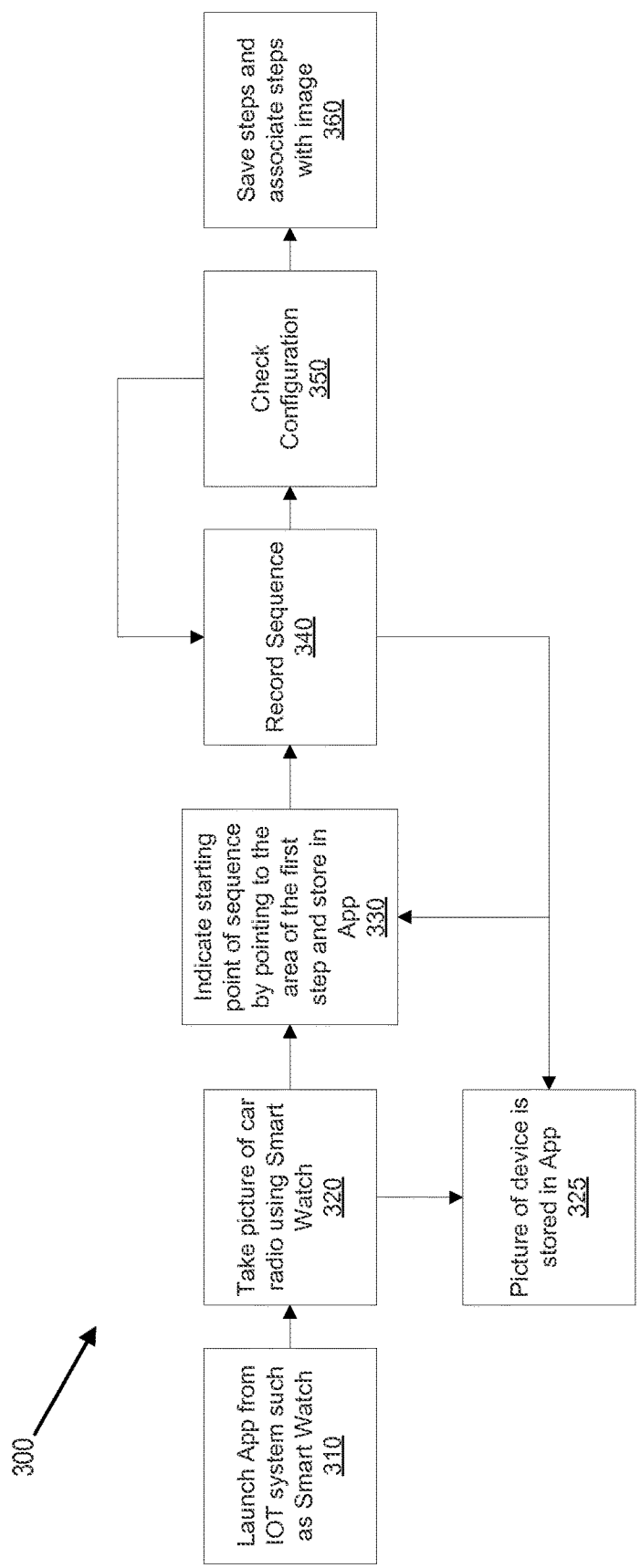
FIG. 3 shows a flow chart of a kinetic sequencing memorization operation.

Referring to FIG. 3, a flow chart of an example kinetic sequencing memorization operation 300 is shown. The flow chart shows the steps of a kinetic sequencing memorization operation for a use case where a user is changing the time of an automobile radio. More specifically, the operation begins at step 310 with a user launching a kinetic sequencing memorization application from an information processing system such as an IoT type information processing system such as an IoT smart watch. Next, at step 320, a user obtains an image of the device being configured. In certain embodiments, this image is obtained by using the camera within the IoT type information processing system to take either a photograph or video of the device. Next at step 325, the image is stored on the information processing system. In certain embodiments, the image is stored within a kinetic sequencing memorization system.

Next at step 330, the user indicates a starting point of a kinetic sequence by e.g., pointing to the area of the first step of the configuration. This indication is stored within the kinetic sequencing memorization system. Next at step 340, the kinetic sequencing memorization system records the kinetic movement of the user while performing the actions used to configure the device, thus obtaining a sequence of kinetic steps. E.g., the steps for configuring a particular device might include hold down a particular button for five seconds until flash, turn the volume to the left to select service, use the scan arrows left/right to get the correct time, etc. In certain embodiments, the recording further includes converting each kinetic movement to a graphical representation of the movement. Next, at step 350, the configuration of the device is checked to assure that the device was configured properly. If the device was not configured properly, then the operation returns to step 340 to again record the sequence of steps. If the device was configured properly then the operation proceeds to step 360 where the sequence of kinetic steps are saved in the kinetic sequencing memorization system. In certain embodiments, the sequence of kinetic steps is also associated with the image of the device being configured. In certain embodiments, the sequence of kinetic steps is overlaid with particular portions of the image of the device being configured. E.g., if a button is pressed for five seconds, then that step in the sequence is associated with the button of the device.

This sequence of kinetic steps along with the associated image is then readily available the next time the device needs to be configured. In certain embodiments, the kinetic sequencing memorization system also includes an image recognition function which may be used to recover the stored sequence of steps the when the information is needed.

It will be appreciated that other use cases are also contemplated. For example, use cases can include a use case of a user repairing an engine, a use case of operating instructions for complex vehicles (e.g., airplanes, helicopters, etc.) and a user case for construction operations such as wiring instructions, plumbing instructions, framing operations, etc.

Although the present invention has been described in detail, it should be understood that various changes, substitutions and alterations can be made hereto without departing from the spirit and scope of the invention as defined by the appended claims.

What is claimed is:

1. A method for memorizing a configuration sequence comprising:
   capturing an image of a device to be configured;
   recording a configuration sequence of physical movements performed by a user when configuring the device to provide a recorded configuration sequence;
   overlaying the sequence of physical movements with the image of the device to provide an overlaid image of the configuration sequence; and,
   storing the sequence of physical movements and the overlaid image of the configuration sequence; and wherein
   the capturing, recording, and overlaying are performed via a wearable device;
   the wearable device determines that a subset of the recorded sequence does not map to objects present in the captured image; and
   the wearable device removes the subset from the recorded configuration sequence.

2. The method of claim 1, wherein:
   the wearable device comprises at least one of a smart watch and smart glasses.

3. The method of claim 1, wherein:
   the wearable device comprises an associated kinetic sensor; and,
   the recording the configuration sequence of physical movements is performed via the kinetic sensor.

4. The method of claim 1, wherein:
the configuration sequence of physical movements is converted into a graphics object indicative of the sequence of physical movement; and
the graphics object is overlaid with the image.

5. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
   capturing an image of a device to be configured;
   recording a configuration sequence of physical movements performed by a user when configuring the device to provide a recorded configuration sequence;
   overlaying the sequence of physical movements with the image of the device to provide an overlaid image of the configuration sequence; and,
   storing the sequence of physical movements and the overlaid image of the configuration sequence; and wherein
the capturing, recording, and overlaying are performed via a wearable device;
the wearable device determines that a subset of the recorded sequence does not map to objects present in the captured image; and
the wearable device removes the subset from the recorded configuration sequence.

6. The system of claim 5, wherein:
the wearable device comprises at least one of a smart watch and smart glasses.

7. The system of claim 5, wherein:
the wearable device comprises an associated kinetic sensor; and,
the recording the configuration sequence of physical movements is performed via the kinetic sensor.

8. The system of claim 5, wherein:
the configuration sequence of physical movements is converted into a graphics object indicative of the sequence of physical movement; and
the graphics object is overlaid with the image.

9. A non-transitory, computer-readable storage medium embodying computer program code, the computer program code comprising computer executable instructions configured for:
   capturing an image of a device to be configured;
   recording a configuration sequence of physical movements performed by a user when configuring the device to provide a recorded configuration sequence;
   overlaying the sequence of physical movements with the image of the device to provide an overlaid image of the configuration sequence; and,
   storing the sequence of physical movements and the overlaid image of the configuration sequence; and wherein
the capturing, recording, and overlaying are performed via a wearable device;
the wearable device determines that a subset of the recorded sequence does not map to objects present in the captured image; and
the wearable device removes the subset from the recorded configuration sequence.

10. The non-transitory, computer-readable storage medium of claim 9, wherein:
the wearable device comprises at least one of a smart watch and smart glasses.

11. The non-transitory, computer-readable storage medium of claim 9, wherein:
the wearable device comprises an associated kinetic sensor; and,
the recording the configuration sequence of physical movements is performed via the kinetic sensor.

12. The non-transitory, computer-readable storage medium of claim 9, wherein:
the configuration sequence of physical movements is converted into a graphics object indicative of the sequence of physical movement; and
the graphics object is overlaid with the image.

* * * * *